United States Patent [19]

Guidat et al.

[11] Patent Number: 5,028,299
[45] Date of Patent: Jul. 2, 1991

[54] INSTALLATION FOR THE CONTINUOUS-FLOW PRODUCTION OF STABILIZED CHIPS OR PARTICLES DERIVED FROM WOOD WASTE

[76] Inventors: Gilbert Guidat, 14 rue Jean Bioletti, St. Laurent, 88000 Epinal, France; Claudine G. de Queiroz, 7 rue du Moulin, Nancy, France, 54000

[21] Appl. No.: 209,736

[22] Filed: Jun. 22, 1988

[30] Foreign Application Priority Data

Jun. 23, 1987 [FR] France ............... 87 08913

[51] Int. Cl.⁵ ........................ C04B 1/74; D21C 1/04
[52] U.S. Cl. ................................. 162/24; 162/26; 162/28; 110/190; 241/28; 241/46.02; 252/62
[58] Field of Search ............... 102/24, 25, 26, 28, 102/261.57; 241/28, 29, 23, 46.02; 252/62; 110/190

[56] References Cited

U.S. PATENT DOCUMENTS 4,528,037 7/1985 Guidat ..................... 252/62

Primary Examiner—Steve Alvo
Attorney, Agent, or Firm—Schwartz & Weinrieb

[57] ABSTRACT

An installation and an industrial process for the production of stabilized wood particles.

The process is characterized by the succession of the following operations: mechanical reduction by a shredder, calibration, thermal treatment by passage through a rotating furnace at a decreasing temperature between 800° C. and 75° C., chemical treatment of impregnation-/absorption/precipitation by successive action on the product while it is still hot by a soluble calcium salt and by a silicate, followed by drying and stabilization.

The installation is characterized by the fact that it is comprised of a station for primary mechanical reduction (4) of wood, which feeds a buffer silo (7) for regulation with recovery of fines, a station for thermal treatment (9) by a rotating furnace (12) followed by a station for further mechanical treatment by a crusher/fiber remover (37) and a station for chemical treatment in a double kneading atomizer (57) ending with a station for supplemental treatment relating to specific applications, and for drying, before the material is warehoused in bulk form or in bags.

This invention is of interest to the areas of construction, agriculture and horticulture, as well as various industrial and related sectors.

7 Claims, 7 Drawing Sheets

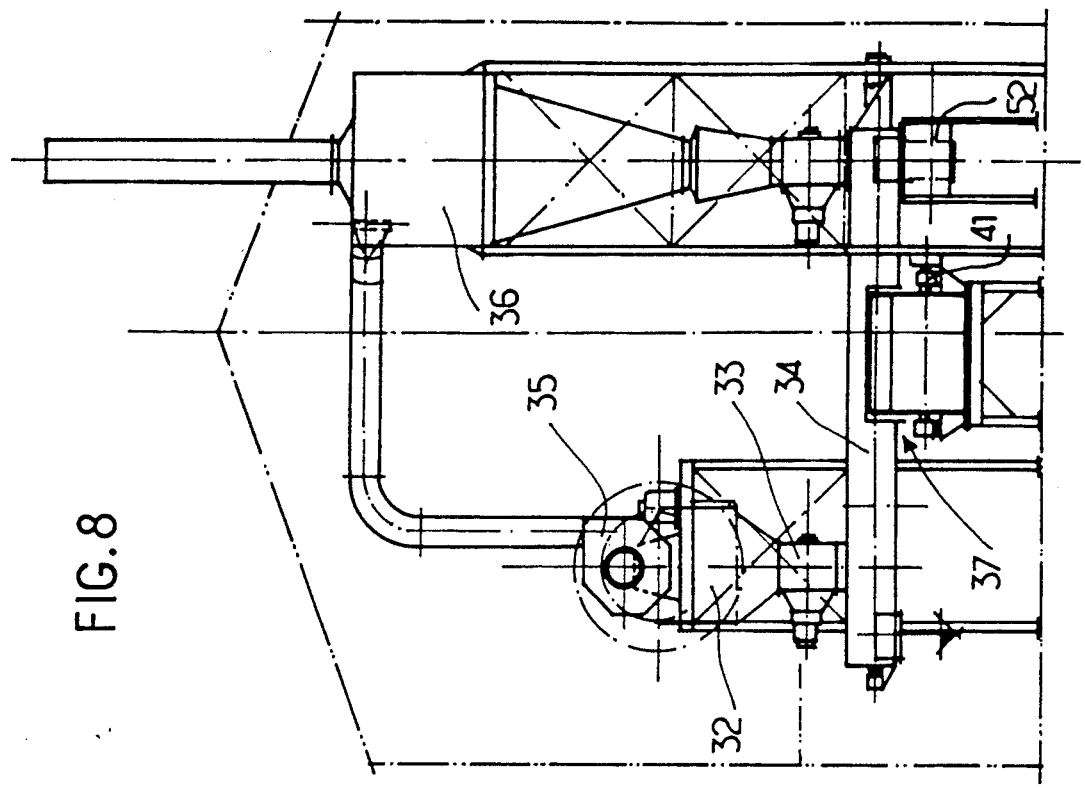
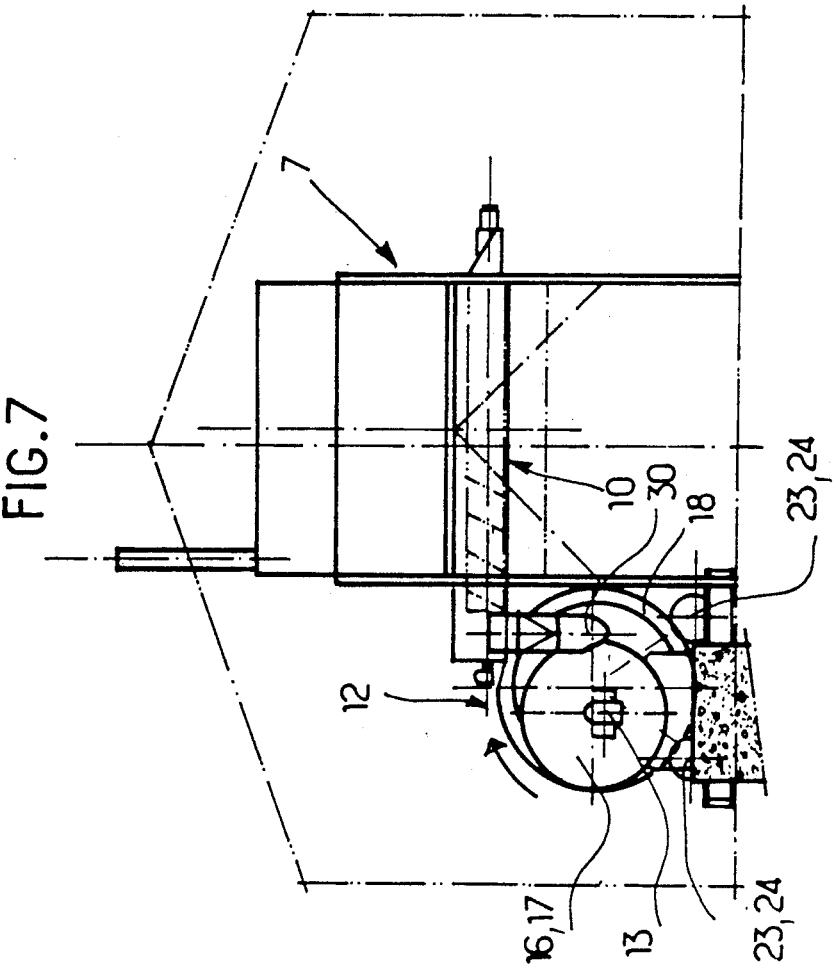

INSTALLATION FOR THE CONTINUOUS-FLOW PRODUCTION OF STABILIZED CHIPS OR PARTICLES DERIVED FROM WOOD WASTE

FIELD OF THE INVENTION

The present invention relates to a process for industrial-quantity, continuous flow production of stabilized chips or particles based on ligno-cellulose waste.

It also, and at the same time, relates to a specific industrial installation intended to implement the process, and to the product obtained.

More generally and without limitation, the industrial installation according to the invention can use as the raw material any material and any matter of the same nature as wood, in other words with ligno-cellulose properties, for industrial implementation of the process for stabilization of wood waste.

The industrial installation and the process according to the invention have, as their purpose the production, in large quantities, of elementary chips or particles of stabilized wood waste, waste which has been chemically treated but not physically denatured, in other words, waste which has all the physically interesting properties of wood thermal, sound and acoustical insulation, thermal mass, low density.

In fact, the general aspect of wood is completely preserved. The stabilization treatment provides essential properties which wood lacks, in order to give it multiple application opportunities in all agricultural and industrial areas, particularly in construction, and in all construction systems.

BACKGROUND OF THE INVENTION

Research has and continues to be conducted, with lesser or greater success, with regard to incorporating ligno-cellulose matter and, in particular, wood waste, into construction materials, especially cement and concrete.

A homogeneous mixture is prepared, starting with cement and conventional construction materials, adding raw or treated ligno-cellulose waste the most varied physical presentations, as a function of the qualities and the properties of the product to be obtained.

In order to accelerate solidification of the cement, calcium chloride or another equivalent salt its conventionally added in variable proportions. This auxiliary material is known in construction and is almost universally used, particularly in concrete production plants. It contributes for obtaining a homogeneous mixture and an intimate bond between the ligno-cellulose matter and the cement, to form a compact and solid product.

The particular care taken in the production of these products does not permit avoidance of any subsequent disadvantages or detrimental behavior of such type of products, disadvantages which are related to the structure of ligno-cellulose materials themselves, which do not entirely lose their properties of variation in dimension and structural slippage, which are a source of cracking.

It is well known that in construction, the stability and the inert character of the material are essential qualities, highly desired and appreciated.

Unfortunately, the above described products and their objects resulting in numerous patents do not meet the expectations of construction professionals, because the do not ensure long-term stability.

In fact, these products, well known and generally available commercially, are of only limited use, because of their separation characteristics, thermal insulation, mechanical strength, sound and insulation characterics, deteriorate with time.

SUMMARY OF THE INVENTION

The product according to the invention differs greatly from the prior products, because it is truly the first material to be used either direct in conjunction with gravity filling, or compacted or ground, or in association with other products. Therefore, this is the first material which can be used as a component of mixtures used in construction and agriculture: cements, mortars agglomerates, walls, partition panels, barrow panels, etc., aswell as fertilizer mixtures, soil improvement compositions, etc.

The process according to the invention implemented by the specific installation described in the following makes the necessary corrections in the overall physical properties of the wood, in order to give it the sought-after properties and a large universality of applications.

One can cite, as an example, the principal qualities and properties thus conferred, which are as follows:

a product which is dimensionnaly stable, resists rotting and is physically and chemically inert; i.e essential qualities which are sought after and appreciated in the construction field;

when integrated in concrete, it presents fire-resistant characteristics, which allow it to be used in protective layers and in fire wall panels;

it is chemically neutral, it does not attack the components of mortar and concrete; it does not modify the action of hydraulic bonding materials because its hydrogen potential is almost neutral.

The product obtained by the industrial process and the industrial installation according to the invention, remedies the conventional disadvantages of lack of heat-resistance and long term stability of conventional mixtures based on wood and cement.

Its constant and permanent dimensional stability allow it to cover the most diverse applications, in the most varied areas.

One can therefore cite, in a non-exhaustive manner, the following applications:

conventional applications as components in the mixtures used in construction: insulation filler, production of panels and pre-fabricated construction blocks; foremost material used in the production of light, elastic, riveted concrete;

domestic and indutrial applications: heat storage, fire insulation, thermal and sound insulation;

agricultural and horticultural applications, such as a culture substrate which allows reduction of soil, temperature regulation and hygrometry, and as a composting medium;

specific applications fitration, animal bedding, and the like.

The present invention has as its objective the purpose of producing the product for the above universal applications industrially, in large quantities and in a continuous regulated flow.

As already indicated above, the numerous advantageous qualities and properties of this product, which provides thermal and sound insulation, are used for rotting-resistant, non-inflammable and light, open multiple opportunities for its application in the most varied areas, of which a few examples from a very long list are stated below:

filler insulation in construction and industrial applications;

exterior insulation for houses and buildings;

absorber for solar collectors and calorie storage for water heaters;

construction applications: used as a foremost material in the production of light, elastic, nail-fastened concrete and mortar;

thermal and sound insulation and hygroscopic absorber;

use as a foremost material to be mixed with various hydraulic bonding agents, as well as all synthetic resins, to form an agglomeration of granulates in the most varied forms.

fire insulation, for example on the underside of hollow brickwork.

applications in the agricultural and horticultural sector, as a culture substrate which allows temperature regulation and hygrometry and an improvement in oxygenation. It retains water, aerates the soil and promotes vegetable metabolism.

structured fertilizer based on ligno-cellulose-granulates.

Furthermore, its production process proves to be particularly in conformity with the current objectives of our industrial economy: Use of low waste and low energy consumption in implementation and treatment.

For this purpose, the invention first of all relates to a process for industrial, continuous flow production of stabilized elementary particles based on ligno-cellulose waste, particularly wood waste, including preliminary mechanical calibration action by cutting and crushing, followed by thermal treatment for sterilization by pyrolysis, by passage through the flame of a burner and along the length of a rotating furnace. The principal process is achieved by chemical treatment of double impregnation/absorption by the action of a calcium salt solution, followed by sprinkling with a silicate solution with the possible incorporation of a black pigment during the final phase. According to the invention, various specific subsequent treatments are provided as a function of specific applications.

The invention also, and at the same time, relates to an installation for industrial production, and includes a station primary for mechanical reduction of wood, which feeds a buffer silo for regulation with recovery of wood dust a station for thermal treatment by a rotating furnace followed by a station for further mechanical treatment by a crusher/fiber remover and a station for chemical treatment in a double mixing atomizer terminating with a station for supplemental treatment relating to specific applications, and for drying, before the material is warehoused in bulk form or in bags.

The industrial process and the installation according to the invention for implementing the same confer the conventional advantages of industrial, continuous-flow production, as well as numerous other advantages.

Not being able to indicate all the advantages, we will limit ourselves to indicating the principal advantages below:

production in a continuous, regulated flow
low energy consumption
ease and rapidity of installation
completely continuous operation
non-polluting waste
great profitability
moderate investment
utilization of wood waste
low, infrequent maintenance
safety assured for the material and for human beings
much greater quantities can be produced than has been the case hitherto.

BRIEF DESCRIPTION OF THE DRAWINGS

The technical characteristics of the process and the installation, and other advantages are provided in the description which follows, provided as a nonlimiting example, with reference to the accompanying drawings, in which:

FIG. 7 is an elevation of the installation at the level of the furnace entrance; and FIG. 8 is an elevation of the installation at the level of the transfer screw and of the crusher/fiber remover.

DETAILED DESCRIPTION OF THE PREFERRED EMBODIMENT

In what follows, the various stations and elements which constitute the chain of regulated, continuous-flow industrial production of stabilized aggregates will be described, while, at the same time, the function, the progression and the treatment of the product at different respective stages and the process used will be explained.

The installation in accordance with the invention makes it possible to continuously produce quantities which are referred to as industrial, in other words, a minimum continuous hourly production of 20 to 25 cubic meters. This invention, of course, aims at and allows much greater production quantities, required by the multiple applications of this product, and continuous, entirely regulated night and day operation.

The installation according to the present invention is intended to implement the industrial process described below simultaneously, with the process including the following seven major phases:
initial mechanical treatment;
primary crushing;
dehydration and sterilization;
subsequent mechanical treatment;
chemical treatment;
supplemental treatment;
drying/stabilization and finishing with an optimal supplemental treatment for the specific application, with the process presenting a variation according to which all the mechanical treatment phases are carried out in a first stage.

Figure 1:
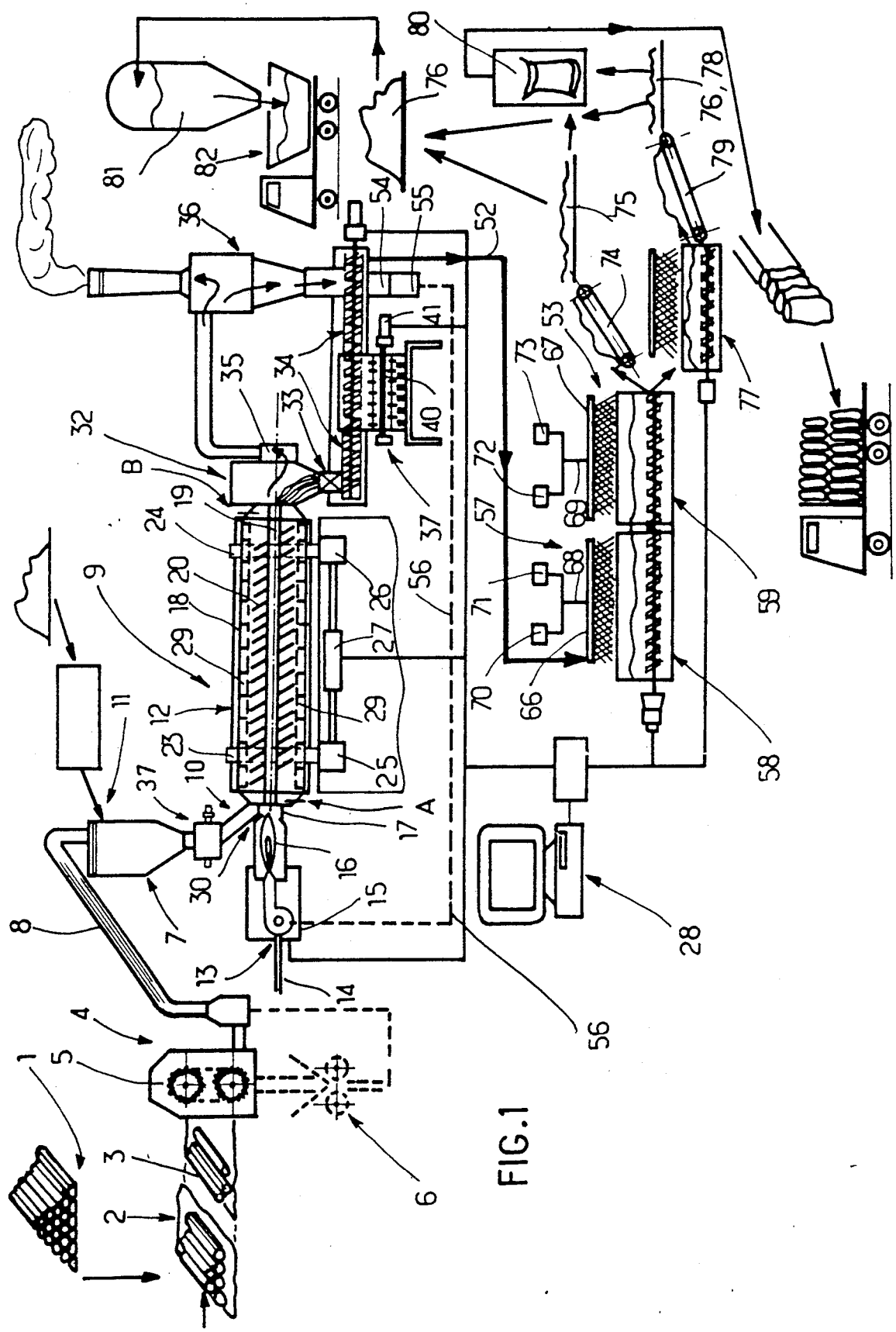
FIG. 1 is a flow chart of a functional of schematic corresponding to the complete installation.
Figure 2:
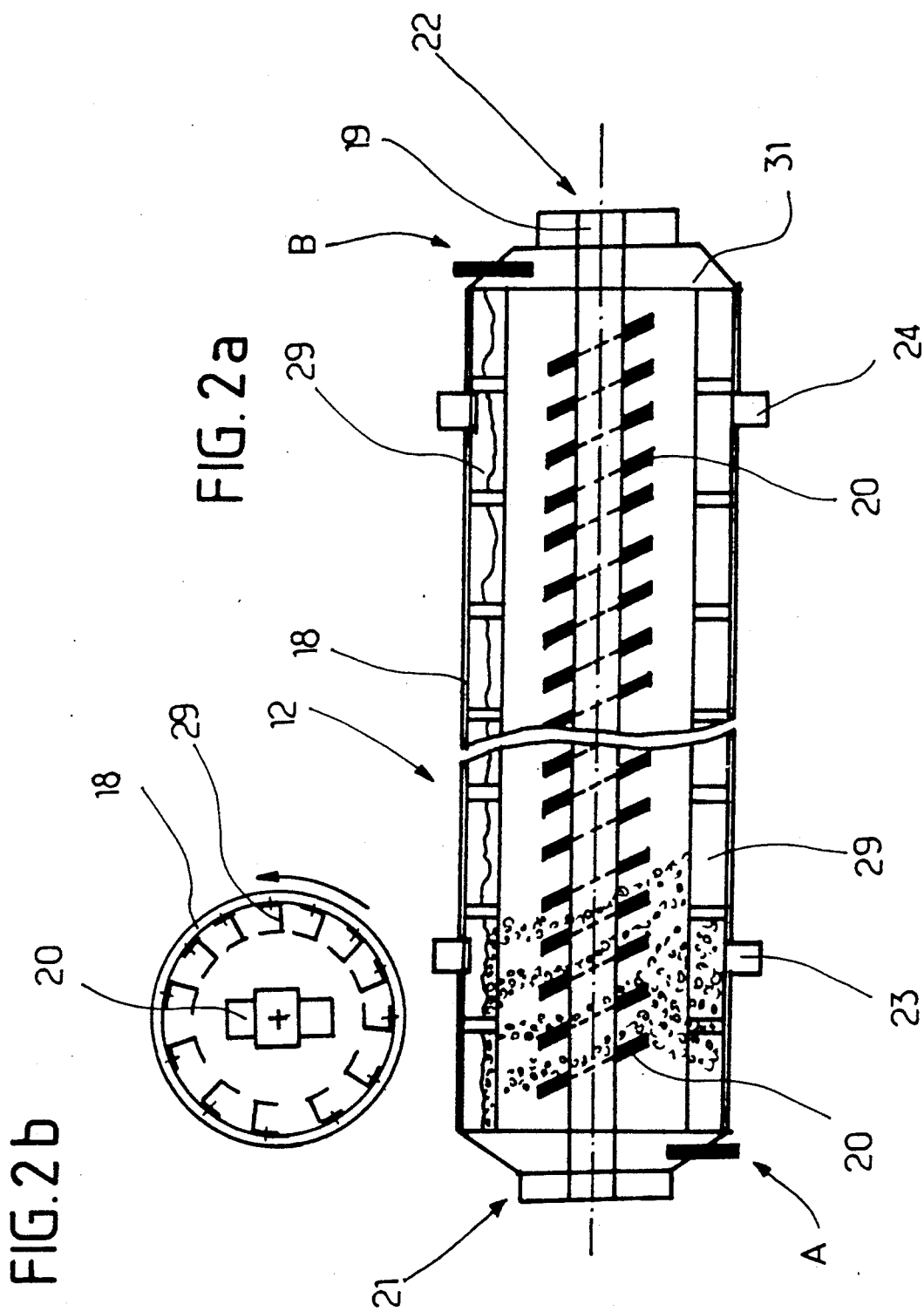
FIGS. 2A and 2B are, respectively, longitudinal and transverse cross-sectional views of the rotating furnace.

The production chain which forms the installation according to the invention includes a succession of the following stations, as shown in FIG. 1. The variations of the process and the installation correspond to the movement of the subsequent mechanical treatment station in a downstream direction, or the existence of two mechanical treatment stations on either side of the thermal treatment station.

For reasons of clarity, the operational sequence of the process will be adopted as a plan.

1) Initial mechanical treatment:

The compete mechanical treatment is carried out in two stages, the first is a primary mechanical treatment carried out prior to the thermal treatment, which entails a simple mechanical reduction to small chips. The second, carried out either downstream from or upstream of the furnace, or only downstream of the furnace, entails pounding/crushing with the aim of reducing the chips, which have been dehydrated in the furnace, to a size, conformance and consistency suitable for their subsequent treatment.

Bulk raw waste: cleared brush, dead forest wood and other analogous waste, and in a general manner, any kind of ligno-cellulose waste, is heaped onto a storage area 1, which is open or covered and then loaded onto a wood feed table 2, and then transported by a suitable transport mechanism 3,—conveyor belt, chain, or platform or some other mechanism—towards an initial mechanical reduction station 4. The essential role of the latter is to carry out mechanical reduction into small pieces in the form of chips, followed by calibration. The initial mechanical reduction station 4 includes a cutter/chopper 5, optionally followed by a grinder/crusher 6, in which grinding is associated with mechanical work, primarily for the initial splitting or loosening of the fibres. A buffer silo 7 for regulation is connected to the output of the grinder by a pneumatic conveyor 8 for feeding at constant volume or weight, a thermal treatment station 9, for example by means of a feed screw or a feeding belt 10, at a controlled speed.

The cutter/chopper 5 carries out a first mechanical reduction into chips, according to the following average dimensions length 20 to 40 mm, width 10 to 20 mm, thickness 5 to 10 mm.

The buffer silo 7 also has a secondary entrance 11 for direct entry of finer products, sawdust, etc., which can be treated simultaneously with the first-named process step.

Preferably, but not necessarily, subsequent mechanical treatment for fiber removal is carried out on the dry product, following thermal treatment in a rotating furnace, by means of a crusher/fiber remover, prior to the chemical treatment.

The chips remain in the buffer silo 7 and, after extraction therefrom, are directed towards a thermal treatment station 9.

The grinder/crusher 6, identical to the one described below, is preferably placed at the entrance to the furnace, and connected with it by means of a metering belt analogous to the metering belt 10 which calibrates a constant volume or weight being continuously delivered, at an adjustable speed, to the rotating furnace below.

2) Primary crushing/pounding

As indicated above, in order to better prepare the product for its thermal treatment, at least one intermediate primary grinding/pounding station has been provided prior to entrance into the thermal treatment station 9.

This primary grinding/pounding makes it possible to increase the heat exchange surface of the pieces, chips and particles of wood produced in this way, so as to improve their dehydration during passage through the furnace.

The crusher used is analogous to the one described in what follows as a crusher/fiber remover in the section called "subsequent mechanical treatment".

As a function of the characteristics of the product to be obtained and those of the wood waste used, the crushing/fiber removal will be more-or-less pushed further downstream or further upstream from the thermal treatment station.

The volume of the mass of the wood waste brought to the furnace can be regulated, but is basically constant for a given system of operation.

The time of passage through the furnace is regulated as a function of the degree of moisture of the wood waste.

The dimensions of the wood waste vary as a function of the intended applications, from elementary particles (sawdust) to small pieces with a size of several millimeters.

3) Thermal treatment:

The thermal treatment station 9 is essentially constitued by a rotating furnace 12, with hot air generated by a forced-air burner 13, fed in turn by an external fuel, at its principal entry 14, or fed by wood waste, with utilization after drying of the calibration and recovery residues, as well as of waste already received in a mechanically ready condition, which later is admitted by way of an auxiliary entry 15.

As an example, a burner with a power between 500,000 and 1,000,000 Kcal/h makes it possible to obtain a flow of 20 to 30 cubic meters/hour for the intended industrial production.

The active elements of the furnace can be regulated by control mechanisms as a function of the various parameters of the thermal treatment process, such as the dryness of the wood, its nature, etc. Thus, the duration of the passage through the furnace and the caloric power are controlled and regulated as a function of the different respective characteristics of the waste, in such a way as to obtain constant characteristics of the products when they leave the furnace.

The burner 13 develops its flame in a combustion chamber 16, followed by a heating chamber 17, into which the chopped products coming from the initial mechanical reduction, followed by a crushing phase are dropped under the effect of gravity. The waste with the least weight is carried up in the draft of hot air created by the burner and is transported by the air flow.

The temperature at the entrance to the heating chamber rises to approximately 700°-800° C.

The rotating furnace 12 takes the shape of a horizontal drum with a cylindrical insulation envelope 18. It includes a fixed central shaft in the form of a hollow, ventilated pipe 19 provided with inclined fins 20 having a variable inclination, with a descending pitch from the input of entry 21 of the furnace to its output 22. This is done in such a way as to direct the product, which falls from the upper part of each fin, towards a drop point located downstream, so as to insure its advancement, its movement and its successive displacement, to a greater or lesser degree, towards the output in this way.

The speed of rotation of the furnace and the inclination of the fins are regulated at an average rate at a linear speed of approximately 3 meters/minute, and at a slower rate, for an application as a culture substrate.

The furnace includes a cylindrical body insulated by an envelope 18 and equipped with at least two similar circular doors 23 and 24 in the shape of cylindrical blocks, which are in driving contact with the friction rollers 25 and 26.

The furnace 12 is driven by a speed reduction motor group 27 which engages the friction rollers 25 and 26, the speed of which can be regulated and controlled by a central processing unit 28, which allows variation of the flow between 15 and 30 cubic meters/hour, as a function of the speed of the subsequent treatment, and the characteristics, particularly the dryness and the nature of the wood waste used. This furnace is also automatically regulated and controlled by a specific operating program, no matter what the quantity and the characteristics of the product received are. The flame of the burner 13 is, of course, dependent on the speed of rotation of the rotating furnace, itself regulated as a function of the variable parameters relating to the characteristics of the product at the input to the furnace, according to the temperature values, transmitted by the temperature probes. One value is referred to as A at the input, and the other being referred to as B at the output. The latter are used as detectors for the purpose of utilizing a differential measure thereof to control the regulation of the furnace operation.

The body of the furnace is equipped on its entire interior lateral surface with elongated buckets 29, coaxial with an opening essentially transverse to each diameter plane. The buckets are arranged according to successive segments which constitute, more or less, open receptacles into which the material drops, which is sliding on the inclined fins 20 at variable inclination angle provided by the central pipe 19, to be dropped onto the fins again, when the bucket arrives at its high position.

The incline of the fins and the speed of rotation of the furnace determine the speed of transit of the products through the furnace, which depends on the characteristics of the product, particularly its degree of dryness and its nature, detected by the temperature difference between the input or entrance and the output or exit of the furnace. This speed is modifed in order to obtain a constant hygrometric quality of the products at the output or exit of the furnace.

This interior arrangement and this structure assure sufficient mixing of the product, in an optimum manner, to achieve homogeneity of treatment and, at the same time, regularity of flow at the exit or output and transport of the product to the output or exit by mixing and whirling in the flow of hot gases emanating from the flame of the burner.

The rotating furnace therefore provides for a second regulation of its operation, following that of the buffer silo 7, which is necessitated by the disparity in the nature and the dryness of the wood waste used.

The furnace has an upper transverse entrance 30 by which the product is dropped into the heating chamber 17 arranged beyond the combustion chamber 16.

The furnace ends at the opposite end with the output or exit 22 in the shape of a truncated cone 31 which communicates with an extraction compartment 32 for the hot products, into which the product is diverted and arrives, acted on by means of gravity and after passing through a sluice 33, in a transport screw 34 which feeds the dehydrated and expanded chips towards a station for subsequent mechanical treatment.

The hot gases given off are drawn off from the hot products in the extraction compartment 32, by a ventilator-aspirator group 35, then conducted by air pressure to a cyclone-type filtration centrifuge unit 36, for the purpose of separating the dust carried along by the gages and vapors, and for assuring forced dust removal.

The volatile matter is passed to the atmosphere, while the dust particles are transported directly by means of gravity to the input or entrance of that part of the installation where chemical treatment is carried out, or diverted to the transport screw 34 upstream from the unit for subsequent mechanical treatment.

Operation of the furnace varies as a function of the nature and the dryness of the wood waste so as to maintain the level of dehydration which corresponds to a temperature of the products, when exiting from the furnace, of approximately 75° C.

4) Subsequent mechanical treatment:

As indicated, this treatment can be carried out prior to entry into the rotating furnace, but also both prior to and after entry thereinto.

Passage through the rotating furnace results in degasification, forced dehydration, and expansion as well as sterilization of the chips which undergo thermal treatment. Then, the dry product, still hot, is fed by the transport screw 34 to a specific element for subsequent mechanical treatment, designed for this type of installation, and referred to hereinafter a crusher/fiber remover.

This makes it possible to transform the chips into elementary particles having a variable size, as a function of the intended application, and to prepare them for chemical treatment by removing their fibers by crushing/pounding and by grinding to a controlled fineness, in order to obtain the following average dimensions: length 1 to 20 mm, width 1 to 10 mm, thickness 1 to 5 mm.

The general yield of the process and the quality of the product are notably improved, because this mechanical treatment is more effectively carried out at the output or exit from the furnace, on the chips which have been perfectly dehydrated and expanded by the thermal effect.

Furthermore, the chips whose fibers have been removed in this way and which have been ground improve the yield of impregnation of the chemical treatment, because their absorption surface has been significantly increased.

Figure 3:
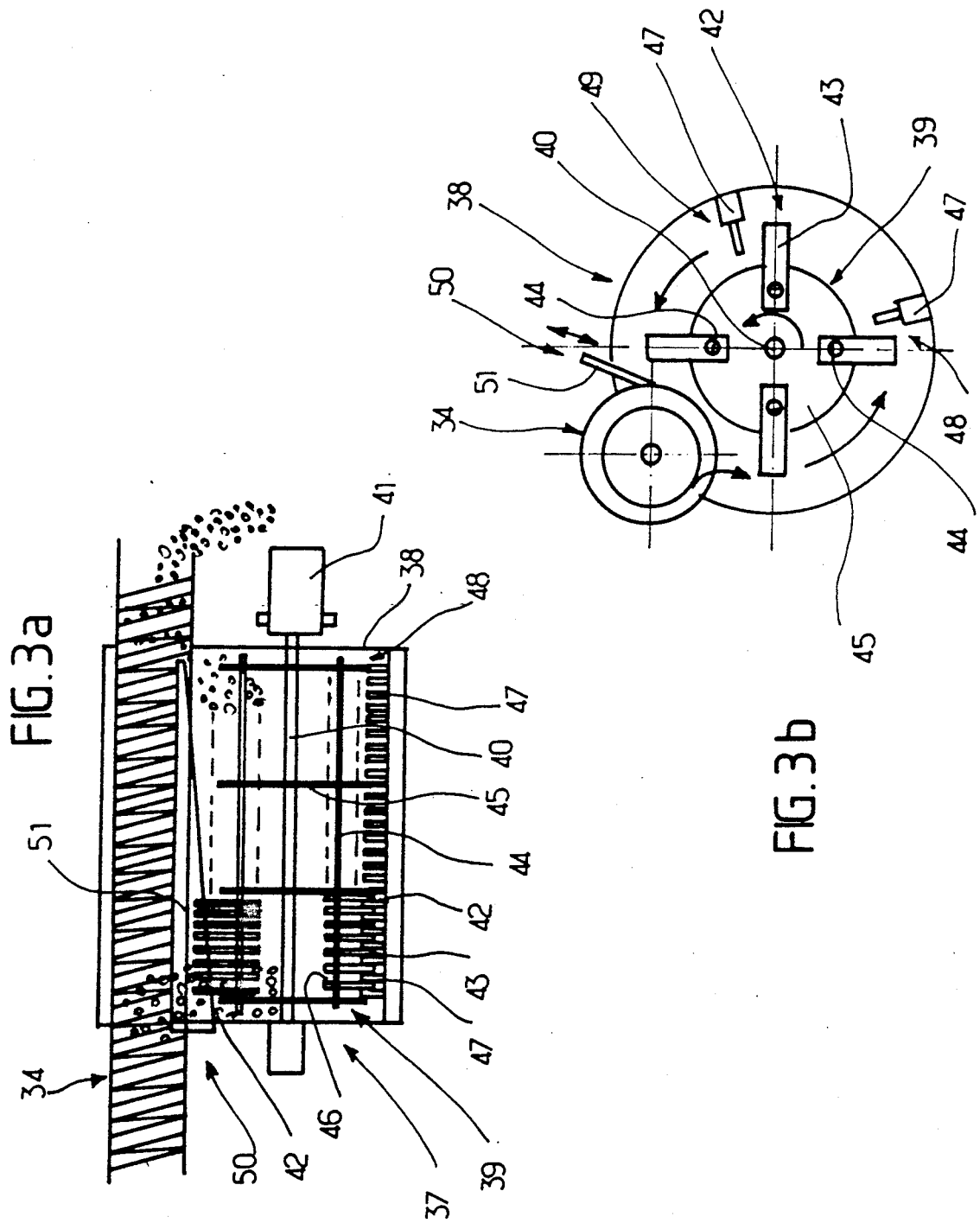
FIGS. 3A and 3B are, respectively, longitudinal and transverse cross-sectional views of the crusher/fiber remover.
Figure 4:
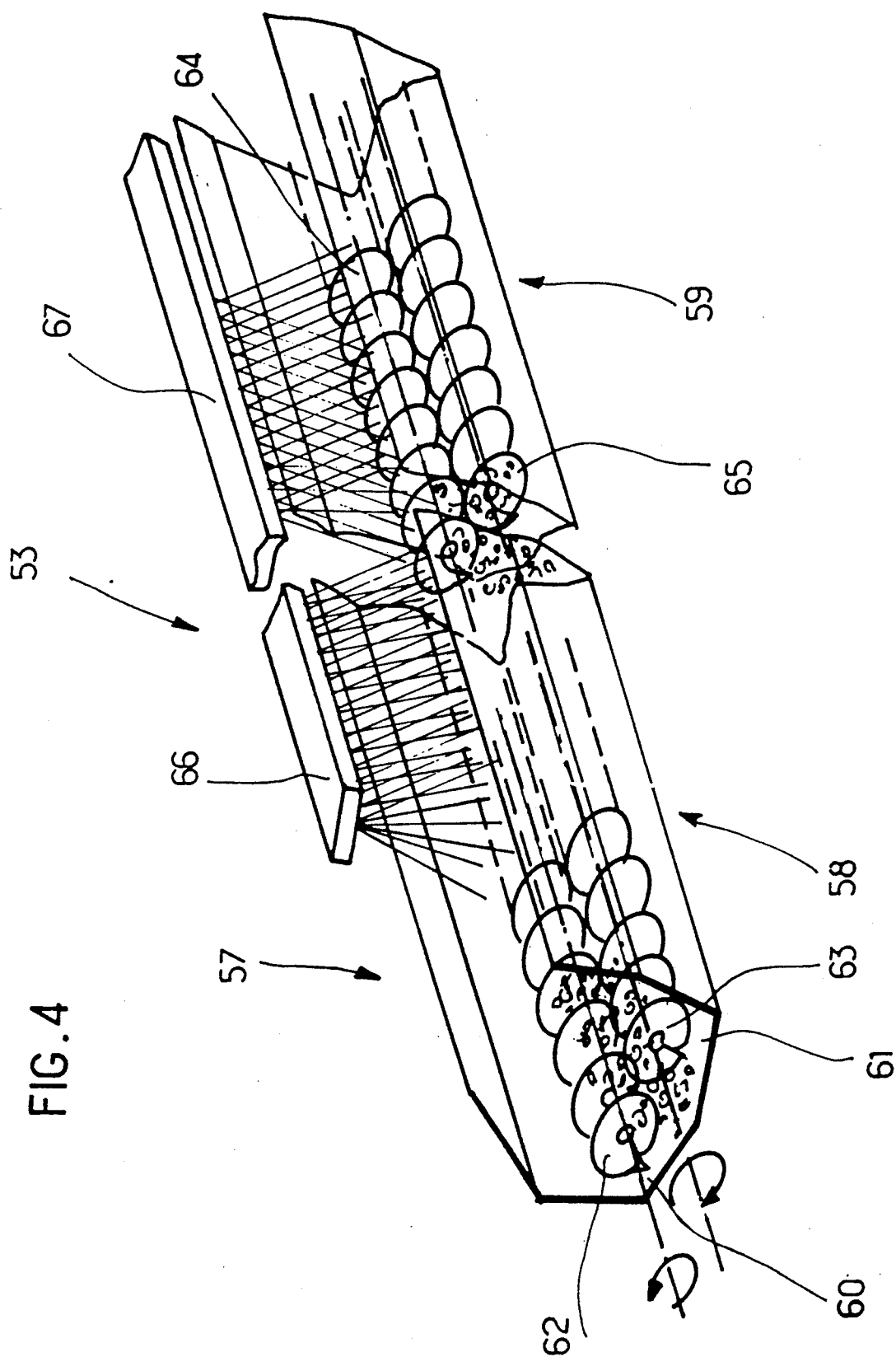
FIG. 4 is a perspective fragmentary view of the linear double mixing atomizer.
Figure 5:
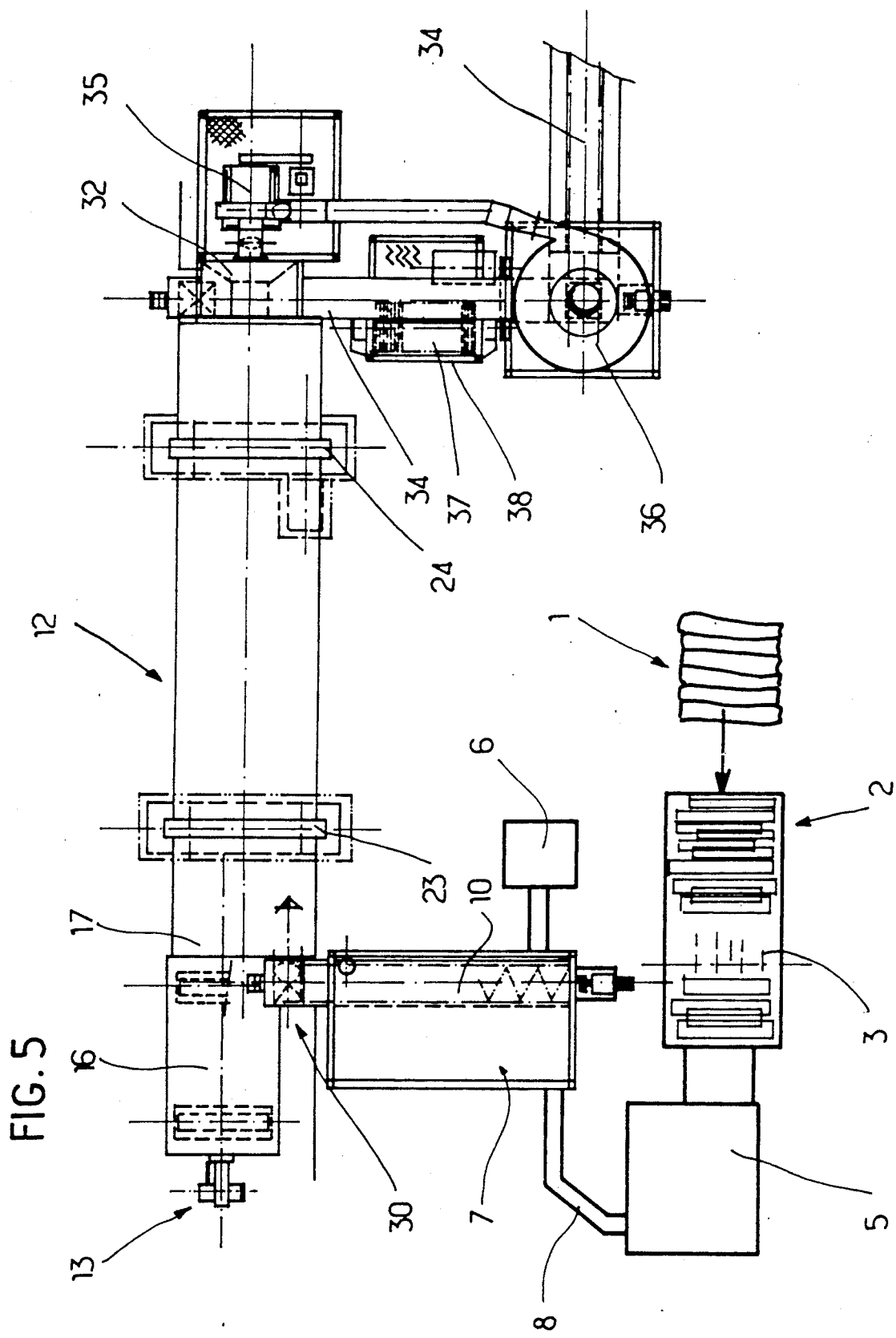
FIG. 5 is a plan view of the unit for mechanical and thermal treatment.
Figure 6:
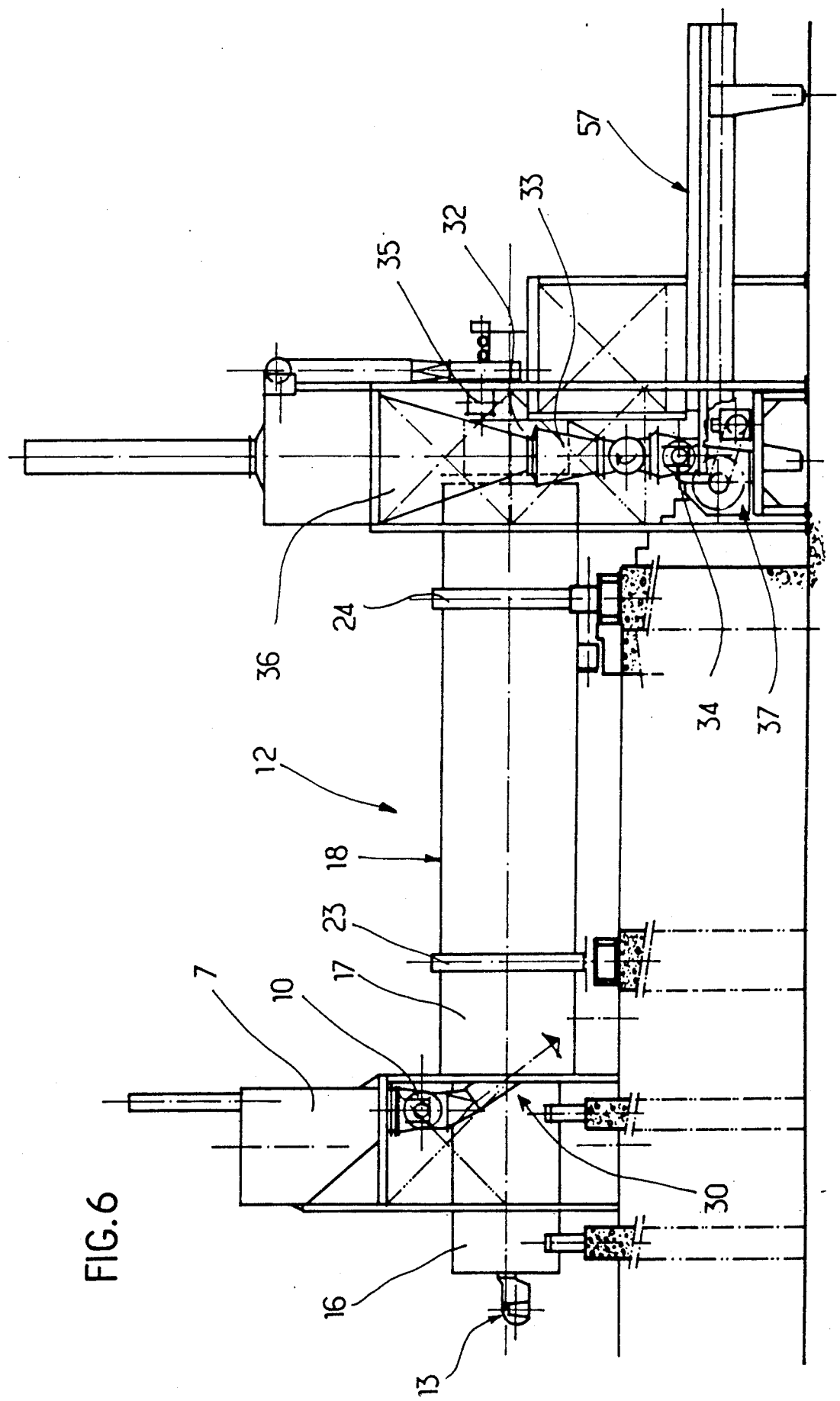
FIG. 6 is a side view of the unit for mechanical and thermal treatment.

An embodiment of the crusher/fiber remover used is shown in FIG. 3.

As indicated, the same type of material can be placed ahead of the rotating furnace.

The crusher/fiber remover 37 is constituted by a compartment 38 through the upper part of which passes the transport screw 34 for transport of the product.

This compartment encloses the active rotary element for crushing, namely a crushing rotor 39.

The compartment which constitutes the body of the crusher/fiber remover is completely filled with elementary chips fed from the rotating furnace by the transport screw 34. Filling is regulated to be almost complete and to remain so during the entire operation.

In continuous operation, the elementary particles keep arriving continuously and are forced towards the crushing rotor 39 by the phenomenon of entrainment generated by the rotation of the parts of the rotor 39 which are carried by an axle 40 and are cinematically connected to an external motor 41, where the latter is controlled by a central processing unit 28.

This rotor, whose speed can be regulated, carries impact masses such as mass 42 in the form of articulated hammers or impactors 43 mounted to pivot on longitudinal rods 44 which are in turn carried by transverse cheek plates 45, which latter are rigidly connected to the rotor axle. There are provided several transversal cheek plates and therefore several groups of impact masses arranged in series along the entire length of the axle.

These impact masses turn with the rotor and are suitably spaced to permit intervals, to arise therebetween such as 46, which will permit admission and passage of the input means between respective fixed counter-blades 47. The latter are arranged longitudinally in a row and are slightly offset at an angle in a downstream region relative to the bottom of the compartment, thereby constituting a strong crushing bar 48. An identical bar 49 is disposed further downstream towards the exit or output of the furnace.

Each of these bars is attached to a support rigid with the compartment.

For reasons of clarity in the drawings of the longitudinal cross-section of FIG. 3, the first crushing bar 48 has been artificially represented as being attached to the bottom of the compartment. Its actual placement is one as shown in the transverse cross-section.

The structure of the impact masses 42 and the counter-blades 47 and the intervals therebetween makes it possible to retain the elementary particles, momentarily by compacting them during the entire crushing period, so as to implement the necessary crushing task and fiber loosing.

The crusher/fiber remover 37 used has the following general characteristics of operation:
speed of rotation of the transport screw: 60 rpm
speed of rotation of the rotor 1500 rpm
flow at the exit: 20 to 25 cubic meters/hour.

The transport screw 34 passes through the compartment assembly at the upper part and continues downstream in the chain. Therefore it serves as a continuous-flow evacuation screw for the product and, at the same time, aids the flow of the product towards the downstream station for chemical treatment after addition of the dust particles recovered, for example by emptying them from the centrifuge filtration assembly 36.

In order to be able to regulate the flow as a function of the characteristics of the empty product and those of the product to be obtained, a movable regulation damper 50 has been provided in the upper part of the compartment.

This damper includes, in a simple version, an elongated deflection plate 51 having a trapezoidal shape and tapered from the input or entrance towards the output or exit, and movable into and out thrust in the wall of a passage in an upper part of the compartment. It constitutes a control deflector for the flow between the input or entrance and the output or exit. This deflector makes it possible to vary the control by changing the cross-section of the passage, by being inserted into the compartment 38 by a greater or lesser extent.

It will be understood that the drive motor for the rotor is regulated as a function of the speed of operation of the transport screw 34 and controlled by the central unit 28, which in turn controls the installation by means of a computer program for coordination of the continuous-flow operation of the unit.

At the output or exit from the crusher/fiber remover, the elementary particles, which have been dehydrated, expanded and suitable freed of fibers, are directed towards a chemical treatment station 53, following addition of dust particles, by means of a suitable transport element, for example by means of an inclined screw feeding 52.

According to one variation, means are also provided for recycling the wood particles, i.e. the output of the crusher/fiber remover supplies a calibrator 54 and a recuperator 55 which carry out separation of the chips or dust particles and which are then directed towards the auxiliary entrance 15 of the burner 13 and used as a fuel according to a recovery circuit 56 shown in dotted lines.

It is understood that the work of mechanical reduction could already be carried out prior to entry into the furnace, by a crusher/fiber remover with or without a refiner, which is located further upstream as described above.

5) Chemical treatment:

The product is admitted, when still hot, into a linear double mixing atomizer 57 formed in two successive sections, an upstream section 58 and a downstream section 59, each of which has a receptor channel 60 and 61 which contains two juxtaposed mixing screws 62,63 and 64,65 which overlap one another. These are mixing screws turning in respective opposite directions in order to assure advancement of the product.

Each section of the mixer or material processor is covered by a respective pulverizer 66 and 67, which follow each other along the length of the mixer or material processor to implement the chemical treatment by two distincts, continuous pulverizing or sprinkling onto the mass of product contained in one or the other section of the linear double mixer or material processor 57.

The successive mixing or processing sections 58 and 59 making up the double mixer 57 follow each other without any discontinuity. The following chemical treatment is carried out by constant pulverization, spraying or sprinkling from the two successive segments 66 and 67 of different respective chemical solutions from each of the segments, from a supply line 68 or 69 connected with one or several vats(s) 70,71 and 72,73 of identical or different respective solutions to be used either directly or in a mixture.

a) Impregnation and absorption and precipitation treatment:

1. Negative impregnation by a solution of a calcium salt:

The product is then brought to ambient temperature and admitted into a linear screw mixer or material processor, where it undergoes negative impregnation by a first sprinkling of a calcium salt solution, preferably calcium chloride, in a concentration equal to 50 kg of pure salt per cubic meter of water, which is a concentration of 5% by weight, in a first part of the length.

The value of this concentration can vary considerably, preferably within the limits of 2 and 10%, as a function of the intended applications and the nature of the wood.

For example, for an application as thermal insulation, the concentration can increase according to the desired degree of fire resistance.

Sprinkling is carried out, for example, at ambient temperature, by an upper pulverization segment, in a quantity between 2 and 10% by volume of the product treated, but preferably 5% until complete penetration and absorption, at a temperature of the solution which is equal to the ambient temperature. That temperature would be 10°-30° C. in a product having a temperature between 30° and 60° C., and preferably at a temperature of 40° C. which is equal to that reached by bringing it to an ambient temperature and by pulverization at the exit or output of the furnace.

This sprinkling or pulverization is carried out continuously during the course of mixing or processing, until saturation, during progression along the length of the grinder, by means of an upper pulverizing segment arranged along the length of the mixer or material processor.

The speed of rotation of the feed screw is regulated so that the product advances in the mixer or material processor at a speed of approximately 3 meters/minute. It is possible to verify that at the end of a period of 2 to 5 minutes, saturation has been reached.

This first impregnation carried out on the hot product completely dilates the pores of the wood, which are already open due to the mechanical treatment and are dried by the thermal treatment. Complete opening of the pores allows the subsequent treatment to penetrate to the very core of the wood.

2. Positive impregnation by a silicate solution and precipitation:

Then, in the same mixer, from its entrance into the second linear part of the grinder, an alkaline metal silicate solution with the same concentration is brought into play, by atomizing at an ambient temperature, using an upper segment, at a quantity between 2 and 15% by volume, but preferably 10%.

The salts used for this treatment are sodium silicate or potassium silicate at a concentration between 2 and 15% by weight, but preferably 10%. The salt chosen depends on the intended application.

This reaction is also carried out on a product which is still hot, in other words at a temperature between 30° and 50° C.

Sprinkling is carried out during the entire time of transit of the product, which is about 3 minutes. The chemical reaction takes place in several minutes. During the course of this reaction, calcium silicate forms by precipitation deed within the wood; this salt is particularly hard and unchangeable, and seals the pores, covers microcavities and immobilizes the fibers of the wood. This effective petrification by this hard and unchangeable salt achieves complete devitalization of the wood and significantly increases its physical and chemical strength.

The pH of the wood, which is originally between 4 and 5, is brought at the exit or output to a value between 6.8 and 7, in other words equal to neutral.

In this way, an inert, chemically neutral product has been formed, which has all the physical qualities of wood: insulation; but also to a lesser degree, those of stone: fire resistance and mechanical strength.

In the upstream section of the linear mixer, the first impregnation by atomizing to saturation with the first soluble salt, for example calcium chloride or any other equivalent salt, is carried out, under all the conditions in conformity with the basic process.

In the second section, the reaction of precipitation in the very core of the wood of a very hard salt, calcium silicate, takes place by atomizing to saturation of a second soluble salt, for example sodium silicate or any equivalent thereof, under all the conditions in conformity with the basic process.

The products are them emptied out and evacuated by directing them via a transfer ramp towards drying areas 75 and warehousing areas 76.

As a variation of the chemical treatment, the actions of the calcium salt and the silicate used can be reversed.

In the following, several processes derived from a variation of the last stage will be described.

The product can be dipped into a black coloring bath, which makes it possible to increase the power of absorption and storage of heat by reducing radiation loss.

Coloring the product black can be carried out in the following manner. A reduced quantity of the silicate, which does not result in total precipitation, is used. The complement is added in a subsequent phase, in the form of a mixture with a black pigment, which will precipitate with the free remaining quantity of calcium choride, namely at the outside of each elementary particle, to form a shell of black-colored silicate, also present inside thereof.

The silicate plays the role of a fixative for the color of the product, which makes it practically indelible.

Also, for example, the silicate can be used in half the quantity, and the other half, which contains the black pigment, can be added in the final phase.

Also, in this case, the salts can be reversed, and the black pigment can be incorporated in the calcium choride.

Also, for the second atomizing, a solution or a suspension made up, in equal proportions, of a solution of a chosen soluble silicated and a non soluble hardening agent dispersed in the above said solution or composition, in which the silicate concentration is equal to, or approximately that of the above, can be used. The preferred hardening agent is silicium dioxide, but any equivalent agent is suitable. This agent has the purpose of improving the insulation between the fibers and the outside environment.

During the reaction, calcium silicate and one or more compositions of different salts forms at the very core of the units treated, in the presence of silicium dioxide, and above all, fixation of the silicium dioxide in the very core of the material takes place.

6) Complemental treatment:

The units formed in this way are then subjected to the following double supplemental or complemental treatment.

A first subsequent sealing treatment is carried out.

For achieving this, in the same mixer, at ambient temperature and with a product which is still at a hot temperature between 20° and 60° C., a third atomizing with a dispersion of a plasticizing product, for example base on a synthetic styrene-acrylic resin or equivalent, is carried out, the purpose of which is to create a protective plasticized film around the units, forming a true seal, which in turn prevents them from re-absorbing moisture. The product used is waterproof but, permeable for water vapor, which allows complete drying of the core of each unit after treatment. On the average, 2.5 to 5 kg of resin per cubic meter of product is used in dispersion in 25 liters of water.

The film created around each elementary piece in this way has a small thickness, on the order of a tenth of millimeter.

With the basic treatment and the first subsequent treatment above, complete immobilization and stabilization of the fibers has been achieved, on the one hand, and on the other, a major limitation of the absorption capacity in a humid environment has been brought about.

Then, the second subsequent treatment is carried out, which is a coating treatment to improve the bonding capacity with hydraulic bonders usually used in construction.

Below, an example of a coating treatment which can be used for the units, which are covered with a thin skin of synthetic film, will be described.

The units, which are still hot, are passed through a silicium-limestone dipping bath, made up, for example, of the following products in the following proportions:
¼ quicklime
½ blast-furnace cinders
¼ silicium dioxide.

Carried out on the hot product, this treatment makes it possible to form an insulating refractory shell around the units, which demonstrates a capability of bonding with the principal hydraulic bonders used in construction for the production of insulating mortar ar concrete.

It will be understood that depending on the application, one or the other of these subsequent treatments will be applied and to varying degrees.

Furthermore, various finishing treatments can be applied, particularly black pigmentation for the needs of thermal absorption or shock-proof coating for mechanical protection.

This new product in a significant progress in the production of mortar and cement destined to be used in the production of insulating cover layers, which can be made with conventional hydraulic bonders without using any special means or particular precautions which must be observed.

If necessary, another type of supplemental treatment, concerning a specific application is carried out at the out put or exit from the double mixer, in a vat or a terminal mixer 77 which makes it possible to proceed to any complementary chemical treatment by a last single or double impregnation, or by a coating bath using an atomized product or any other operation of complementary treatment.

This involves, for example, impregnation and fixation of adhesives, pigments, hardeners and other finishing products which give the product additional properties.

7) Drying/stabilization

The product treated in this way is evacuated towards an additional drying area 78 by an emptying ramp 79, where it stays during a period of stabilization, during which fixation and hardening take place.

The product is then collected by a bagger 80 or stored in bulk, covered, in a silo 81 or in the open air, to be picked up and transported in bulk, for example using grain hoppers 82.

In the installation according to the invention, at least three different levels of regulation and adaptation are noted, in such a way as to allow continuous-flow industrial production regardless of the nature, the quality and the characteristics of the waste used:

Regulation of feed to the crusher:

The connection between the buffer silo and the primary crusher is a metering screw with and adjustable speed or an extraction screw with a variable rotating speed, in such a way to achieve a fixed flow of feed to the crusher, which allows the latter to operate under optimum conditions.

Regulation of feed to the furnace and the chemical treatment station:

The crusher/fiber remover has two possible control settings.

The first concerns the speed of rotor rotation and the exit flow.

The second relates to the cutting table, the forward speed of which can be adjusted, allowing the flow of material to remain in the crusher/fiber remover for a shorter or longer period of time.

These two possibilities make it possible to obtain a regulating effect and a variation in production between 15 and 30 cubic meters/hour, as needed.

Regulation of furnace operation:

The thermal treatment of the products, which have been calibrated but differ in nature and degree of moisture, is adapted to a constant flow.

To do this, the two temperature probes A and B, arranged at opposite respective ends of the furnace, namely A at the entrance and B at the out put or exit, are used as detectors to control the regulated operation of the furnace, in such a way as to obtain thermal treatment with a constant quality, by acting on:
the power of the burner,
the speed of rotation of the furnace,
the incline of the fins, to vary the speed of progression of the product inside the furnace.

The different regulating actions and their sequence are derived form the furnace operation program.

Although the process and the installation according to the invention have been described in detail above, it is understood that they are not limited only to the means indicated, but that on the contrary, they include all the possible variations, as set forth in the claims hereinafter.

We claim:

1. An industrial installation for the continuous-flow production of stabilized chips or particles derived from wood waste, comprising:

a station for the primary mechanical reduction (4) of said wood waste;

a buffer silo (7) connected to said primary mechanical reduction station for regulation of the flow of said wood waste in accordance with a predetermined volume or weight flow rate, and having a secondary entrance for the introduction of sawdust;

a thermal treatment station (9) for receiving said regulated amount of said wood waste from said buffer silo, and including a rotating furnace (12), with the hot air thereof generated by means of a burner (13), the flame of which is developed within a combustion chamber (16) followed by means of a heating chamber (17), into which said wood waste products coming from said buffer silo (7) are admitted by means of a metering screw, and in which a temperature-measuring probe A is provided, with said rotating furnace (12) being driven by means of a motor-reduction group (27) which meshes with friction rollers (25 and 26) which rest against and drive circular doors (23 and 24) disposed exterior to the body of said furnace (12), and wherein the exit from said furnace includes a second temperature-measuring probe B which, together with probe A, defines a means for measuring a differential in temperature between said probes A and B and said furnace exit and the furnace entrance so as to control the temperature parameter of said regulated flow of said waste products;

an extraction compartment (32) for receiving said waste products, heated by said rotating furnace, under the influence of gravity;

a lock (33) and a transport screw (34), receiving said heated products from said extraction compartment, disposed within a subsequent mechanical treatment station which also includes a crusher-fiber remover

(37) which is traversed by means of said transport screw (34);

a thermal treatment station (53) included a linear double kneader-mister (57) comprising two successive misting segments (66 and 67) for implementing two successive chemical treatments by means of two misting operations;

a thermal kneader (77) for performing subsequent chemical treatment to said products received from said thermal treatment station (53); and silo means (81) or bagger means (80) for storing said products in bulk form prior to transportation of said stored products by means of truck vehicles or grain hoppers (82).

2. An installation according to claim 1, wherein: the primary mechanical reduction station (4) comprises a feed table (2), a cutter-chopper (5) which supplies the buffer silo (7) by way of a pneumatic conveyor (8), and a crusher-fiber remover connected by a transport screw (10) to a thermal treatment station (9) supplied as needed.

3. An installation according to claim 1, wherein: the body of the rotating furnace has cylindrical insulation envelope (18) and a fixed central shaft in the form of a crossed, ventilated pipe (19) provided with inclined fins (20) with a variable inclination, with a descending pitch from the entrance towards the exit of the furnace, and that the interior surface of the cylindrical envelope (18) comprises longitudinal and coaxial depressions (29), with an opening essentially transversal to each diameter plane, which constitute open receptacles with the rotation of the furnace.

4. An installation according to claim 1, wherein: the upper exit of the extraction compartment (32) for the hot products is connected with the ventilator-aspirator group (35) to bring the said hot products to a centrifuge filtration assembly (36) under air pressure, where extraction and separation of the fines and volatile matter is carried out.

5. An installation according to claim 1, wherein: the crusher-fiber remover (37) is comprised of a compartment (38) through the upper part of which the transport screw (34) passes, and a crushing rotor (39) carried by an axle (40), with the said rotor comprising impact masses (42) in the shape of articulated hammers (43) mounted to pivot on longitudinal rods (44) carried by transversal cheeks (45) which are part of the rotor axle, the said impact masses passing between two fixed counter-blades (47) attached to the crushing bars (48 and 49), and that the crusher-fiber remover (37) can be regulated automatically, and that it comprises a movable regulation damper (50) in the upper part of the compartment, comprised of a longitudinal deviation plate (51) with a trapezoidal shape tapering from the entrance towards the exit.

6. An installation according to claim 1, wherein: that the fines are recycled either at an auxiliary entrance of the burner, by a recovery circuit (56), or into the transport screw (34) downstream from the crusher-fiber remover (37).

7. An installation according to claim 1, wherein: the linear double kneader (57) is formed of an upstream section (58) followed by a downstream section (59), each of which contains two juxtaposed mixing screws (62, 63) and (64, 65) which overlap one another and turn in opposite directions, with segments (66 and 67) being located above each section, connected with one or several vats (70, 71) and (72, 73).

* * * * *